United States Patent
Flanagan et al.

(10) Patent No.: US 7,130,790 B1
(45) Date of Patent: Oct. 31, 2006

(54) SYSTEM AND METHOD FOR CLOSED CAPTION DATA TRANSLATION

(75) Inventors: Mary A. Flanagan, Framingham, MA (US); Philip Jensen, Columbus, OH (US); Douglas P. Chinnock, Tucson, AZ (US)

(73) Assignee: Global Translations, Inc., New Albany, OH (US)

( * ) Notice: Subject to any disclaimer, the term of this patent is extended or adjusted under 35 U.S.C. 154(b) by 574 days.

(21) Appl. No.: 09/695,631

(22) Filed: Oct. 24, 2000

(51) Int. Cl.
*G06F 17/28* (2006.01)
*H04N 7/025* (2006.01)

(52) U.S. Cl. .............. 704/2; 704/3; 348/468

(58) Field of Classification Search ........... 704/235, 704/260, 2–3, 8, 250; 348/468; 715/530, 715/536, 532–533
See application file for complete search history.

(56) References Cited

U.S. PATENT DOCUMENTS

| | | | | |
|---|---|---|---|---|
| 5,457,542 A * | 10/1995 | Kim | ............................. | 386/7 |
| 5,543,851 A * | 8/1996 | Chang | ........................ | 348/468 |
| 5,615,301 A | 3/1997 | Rivers | ....................... | 395/2.86 |
| 5,677,739 A * | 10/1997 | Kirkland | ...................... | 704/260 |
| 5,701,161 A | 12/1997 | Williams et al. | ............ | 348/468 |
| 5,900,908 A | 5/1999 | Kirkland | ...................... | 348/62 |
| 5,943,648 A | 8/1999 | Tel | ............................. | 704/260 |
| 6,320,621 B1 * | 11/2001 | Fu | ............................. | 348/465 |
| 6,338,033 B1 * | 1/2002 | Bourbonnais et al. | ......... | 704/7 |
| 6,393,389 B1 * | 5/2002 | Chanod et al. | ................ | 704/7 |
| 6,412,011 B1 * | 6/2002 | Agraharam et al. | ........ | 709/231 |
| 6,658,627 B1 * | 12/2003 | Gallup et al. | ............... | 715/536 |
| 2001/0025241 A1 * | 9/2001 | Lange et al. | ................ | 704/235 |
| 2001/0037510 A1 * | 11/2001 | Lee | ............................. | 725/109 |
| 2001/0044726 A1 * | 11/2001 | Li et al. | ..................... | 704/277 |

FOREIGN PATENT DOCUMENTS

JP 10234016 A * 9/1998

OTHER PUBLICATIONS

Translation of JP10234016A, Dec. 24, 2004.*
Nyberg et al. "A Real-Time MT System for Translating Broadcast Captions," 1997. In Proceedings of MT Summit VI.*
Toole et al. "Time-constrained Machine Translation." In Proceedings of the Third Conference of the Association for Machine Translation in the Americas (AMTA-98), 1998, pp. 103-112.*
Turcato et al. "Pre-Processing Closed Captions for Machine Translation," Proceedings of the ANLP/NAACL Workshop on Embedded Machine Translation Systems, pp. 38-45, May 2000.*

* cited by examiner

*Primary Examiner*—David Hudspeth
*Assistant Examiner*—James S. Wozniak
(74) *Attorney, Agent, or Firm*—Standley Law Group LLP

(57) ABSTRACT

A system and method is disclosed for translating closed caption data from a source language to a target language during a broadcast. The system and method are fully automated to provide accurate and timely translations of closed caption data. The system and method include a text flow management process and a pre-editing process that may be used in conjunction with any machine translation system. The text flow management process facilitates the input of closed caption data in a source language from a program source to the output of closed caption data in a target language to a program destination. The pre-editing process improves the quality of translation performed by machine translation software by addressing various problems associated with real-time translation of closed caption data.

19 Claims, 5 Drawing Sheets

SYSTEM AND METHOD FOR CLOSED CAPTION DATA TRANSLATION

TECHNICAL FIELD

The present invention relates to transmission of closed caption data with broadcast signals. In particular, the present invention relates to translation of closed caption data from a source language to a target language.

BACKGROUND OF THE INVENTION

Despite the widespread access to television technology worldwide, language remains a barrier to broad dissemination of program content. More television content is developed in English than in any other language, yet English is spoken by only a tiny fraction of the world's population. Likewise, programming developed in other languages is inaccessible to speakers of English. A small amount of this content is translated by traditional means at high cost and with delays of weeks or even months. However, for television content that is perishable in nature, such as news, sports, or financial programs, there is no solution to broad distribution across languages. Such programming rapidly decreases in relevance over time, making the translation delays of weeks or more unacceptable. As a result, virtually all live television content goes untranslated, with different live programming developed specifically for each language market.

Live and time-sensitive television content is increasingly being delivered over the Internet in the form of streaming video. Broadband Internet access, a de facto requirement for consumer access to streaming video, is being rapidly adopted by U.S. households. Market research suggests that by 2003, close to 9 million U.S. households will subscribe to a cable modem, up from 1.3 million at 1999 year-end. In Western Europe, exponential growth is predicted in the use of cable modems over the 1998–2003 time frame, and surveys are already showing that high speed access (ISDN or greater) is the predominant mode of Internet access. Regardless of the whether the delivery medium is a television set or an Internet-ready computer, language remains the critical barrier to widespread use of this broadcast content.

SUMMARY OF THE INVENTION

The present invention is a system and method for translating closed caption data. Closed caption data received from a television broadcast are translated, virtually in real-time, so that a viewer can read the closed caption data in his or her preferred language as the television program is broadcast. The present invention instantly localizes television program content by translating the closed caption data. The process of the present invention is fully automated, and may be used in conjunction with any machine translation system that has adequate performance to process translation in real-time to keep up with the program flow of caption data. A server supports real-time translation of eight television channels simultaneously, and translations are produced with less than a one-second delay. The server can produce either closed caption or subtitled output. An optional Separate Audio Program (SAP) may be added to the output that contains a computer generated speech rendering of one translation.

In accordance with the present invention, closed caption data is pre-edited to correct errors, recognize relevant text breaks, and enhance input quality to the machine translation system. For example, misspellings in the caption data are corrected before machine translation so that the machine translation system provides a correct translation from the source language to the target language. Incomplete sentences are detected and flagged or expanded so that the machine translation system provides a more accurate translation. The pre-editing process, which is unique to the present invention, results in high quality translations from commercially available machine translation systems. A unique text-flow management process further facilitates the processing and translating of text through the various components of the present invention.

DETAILED DESCRIPTION OF THE DRAWINGS

Figure 1:
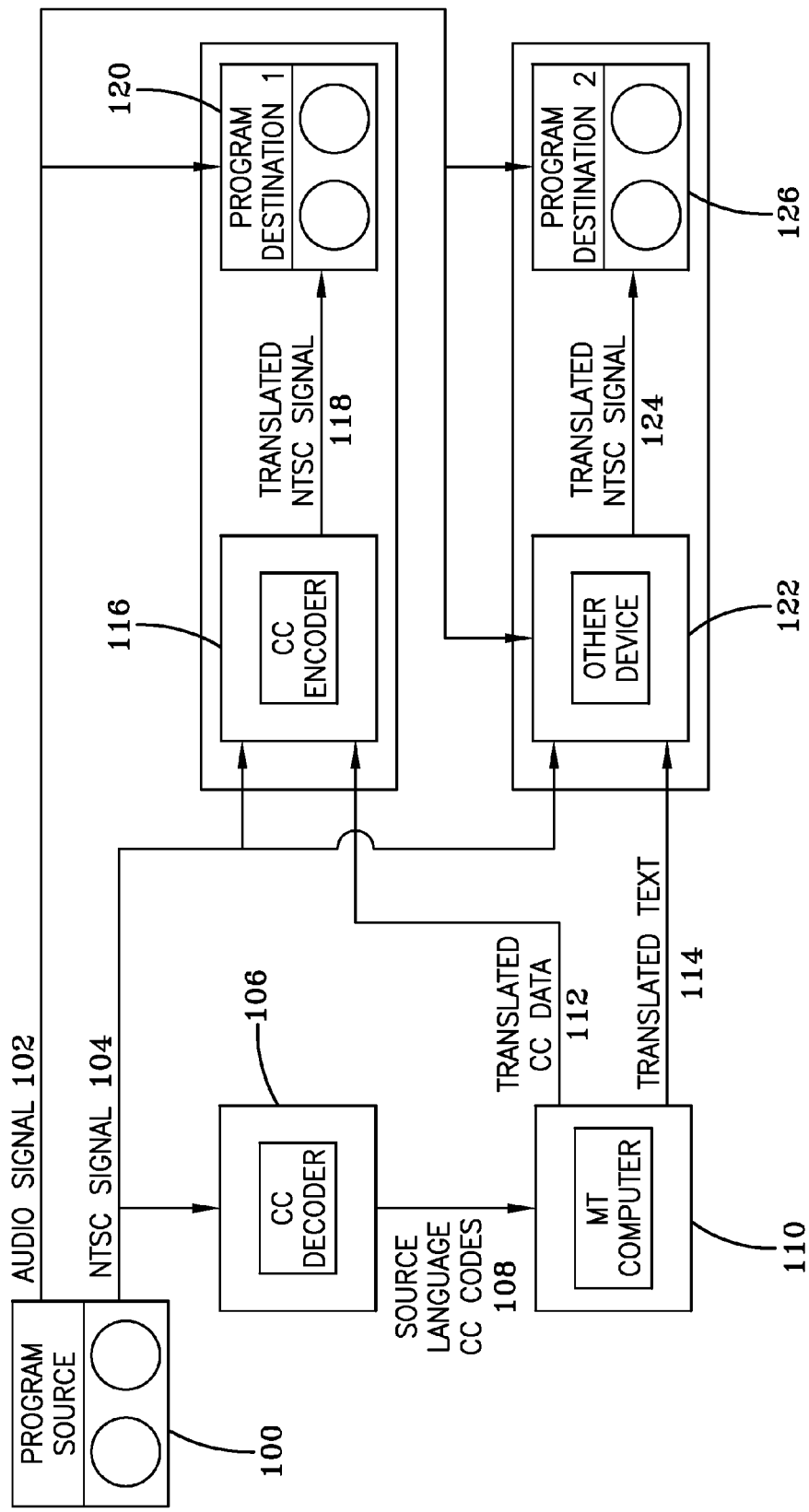
FIG. 1 is a schematic diagram of the primary components for translation of streamed captions in accordance with an example embodiment of the present invention.

Referring to FIG. 1, a schematic diagram of the primary components for translation of streamed captions in accordance with an example embodiment of the present invention is shown. The program source 100 signal originates from a videotape recorder (VTR) or feed from a live cable or satellite signal. The program source 100 video, which may be in either National Television Systems Committee (NTSC) signal 104 format or National Association of Broadcasters (NAB) format consisting of video and closed caption (CC) data in the vertical blanking interval (VBI), is provided to both the CC decoder 106 and to the CC encoder 116 and another device 122. The other device 122 may be a subtitler that produces subtitles from translated text 114 received from the MT computer 110. Alternatively (or in addition), the other device 122 may be a text-to-speech (TTS) device (e.g., Lucent Technologies' "Lucent Speech Solutions" product) that synthesizes speech from the translated text 114. The synthesized speech from the TTS device 122 is placed into the Separate Audio Program (SAP) portion of the audio signal 102. Although FIG. 1 shows transmission of the NTSC signal 104 to the CC encoder 116 and the other device 122 (e.g., subtitler or TTS device), in alternative embodiments of the present invention, the NTSC signal 104 may be transmitted to either the CC encoder 116 or the other device 122 and the MT computer may be adapted to send translated CC data 112 to a CC encoder 116 or translated text 114 to another device 122. Any type of signal that comprises closed caption data may be directed to the MT computer 110 for translation. In addition to the NTSC signal, the present invention may also be used with the European NAB format program signal.

The CC decoder 106 extracts the CC codes (which consist of text, position, and font information) from the NTSC signal 104 and provides them to the MT computer 110 as a serial stream. In an example embodiment of the present invention, source language CC codes 108 may be transmitted from the CC decoder 106 to the MT computer 110.

The machine translation or MT computer 110 is a server that may be a Windows NT/2000 PC equipped with two serial ports. The MT computer 110 comprises machine translation (MT) software that performs automatic translation of human languages such as Transparent Language's Transcend SDK, Version 2.0. The MT software translates text from a first or source language to text in a second or target language. The MT software on the MT computer 110 translates the source language text stream or CC codes 108 from the CC decoder 106 to a target language. The target language may be any language (e.g., French, German, Japanese, or English) supported by the MT software on the MT computer 110. Then, the MT computer 110 merges the translated text stream with position and font information from the original CC codes. Resulting translated CC data 112 are transmitted to the CC encoder 116 as a serial stream. Resulting translated text 114 is transmitted to the other device 122 (e.g., subtitler or TTS device), also as a serial stream.

The CC encoder 116 combines the NTSC signal 104 or video portion of the program from the program source 100 and the translated CC data 112 from the MT computer 110 to produce a new, translated NTSC video signal 118. The translated NTSC signal 118 is transmitted to the program destination 120. The final NTSC video signal 118, along with the audio signal 102 of the program source 100, is provided to the program destination 120, which may be a VTR or feed for a television or Internet broadcast.

Similarly, if the other device 122 is a subtitler, it combines the NTSC signal 104 or video portion of the program from the program source 100 and the translated text 114 from the MT computer 110 to produce a new, translated NTSC video signal 124. The translated NTSC signal 124 is transmitted to the program destination 126. The final NTSC video signal 124, along with the audio signal 102 of the program source 100, is provided to the program destination 126, which may be a VTR or feed for a television or Internet broadcast. In addition, or alternatively, if the other device 122 is a TTS device, it combines the audio signal 102 from the program source 100 to produce a SAP channel for the audio provided to the program destination 126.

Figure 2:
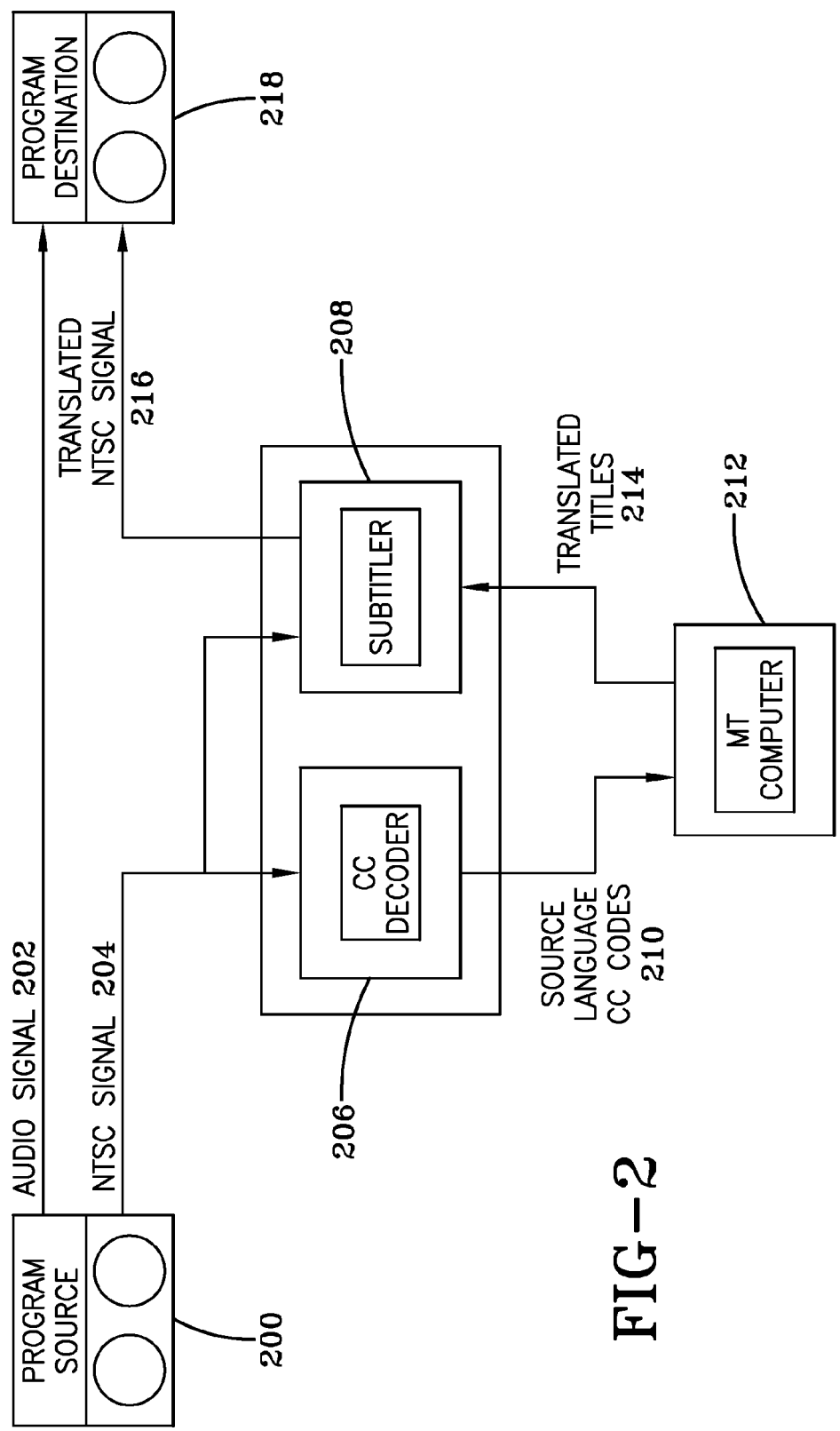
FIG. 2 is a schematic diagram of the primary components for translation of closed caption data with a combination decoder/subtitler device in accordance with an example embodiment of the present invention.

Referring to FIG. 2, an example embodiment of the present invention is shown in which closed caption data is translated for a program destination in accordance with a combination decoder/subtitler device (e.g., an Ultech SG401). Audio signals 202 and NTSC signals 204 originate from a program source 200. The NTSC signal 204 or video signal (which consists of video and CC data) is transmitted from the program source 200 to an Ultech SG401 device that comprises a CC decoder 206 and subtitler 208. The CC decoder 206 extracts the source language CC codes 210 which consist of text, position, and font information and provides them to the MT computer 212 as a serial stream. The MT computer 212, which comprises MT software as explained above, translates the source language CC codes 210 from the CC decoder 206. The MT computer 212 merges the translated data with position and font information and provides the resulting translated text 214 to the subtitler 208, also as a serial stream. The subtitler 208 combines the video portion of the program from the program source and the translated text 214 from the MT computer 212. The result is a new translated NTSC signal 216 with translated subtitles. The final NTSC signal 216, along with the audio signal 202 from the program source 200, is provided to program destination 218 which may be a VTR or feed for a television or Internet broadcast. In addition, the translated text 214 may be processed by a text-to-speech (TTS) module (e.g., Lucent Technologies' "Lucent Speech Solutions" product) that synthesizes speech which is placed into the Separate Audio Program (SAP) portion of the audio signal provided to program destination 218.

Figure 3:
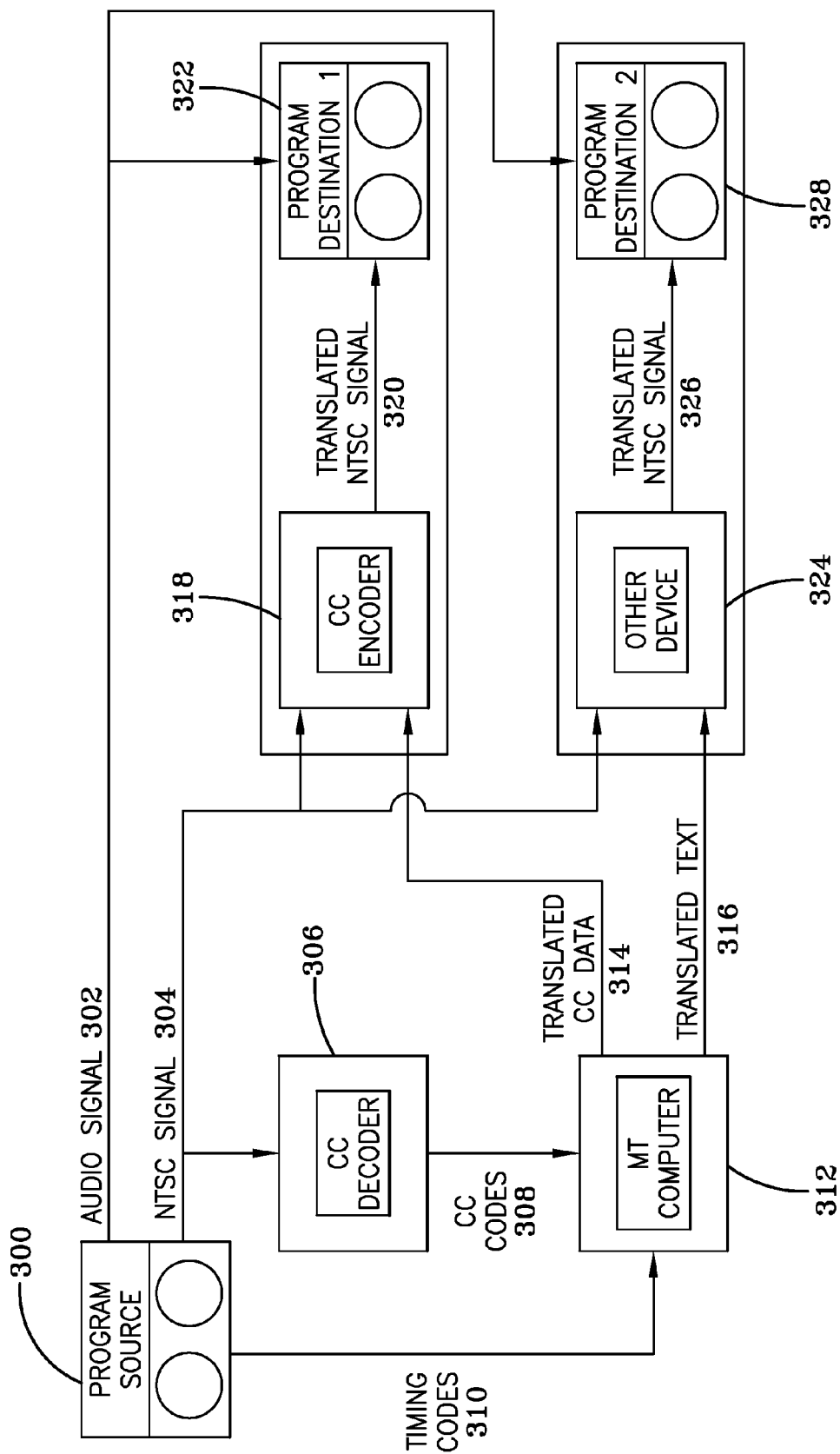
FIG. 3 is schematic diagram of the primary components for translation of time positioned captions in accordance with an example embodiment of the present invention.

Referring to FIG. 3, a schematic diagram of the primary components for translation of time positioned captions in accordance with an example embodiment of the present invention is shown. The program source 300 NTSC signals 304 are processed in two tape passes. The NTSC signals 304 originate from a VTR program source 300. The NTSC signals 304 from the VTR program source 300 consist of video and caption data in the VBI. The NTSC signals 304 are transmitted from the program source 300 to the CC decoder 306. In addition, timing codes 310 are sent from the VTR program source 300 to a MT computer 312. The MT computer 312 may be adapted to send translated CC data 314 to a CC encoder 318 or translated text 316 to another device 324 such as a subtitler or TTS device.

The CC decoder 306 extracts the source language CC codes 308 which consist of text, position, and font information and provides them to the MT computer 312 as a serial stream. The MT computer 312 records, to a first file, the timing codes 310 and CC codes 308 for the entire program. The MT computer 312 then processes the first file to produce a second file with timing, translated data, position, and font information.

Next, a second pass of the program source tape 300 is made. On the second pass, the timing codes 310 are used by the MT computer 312 to determine when to send translated CC data 314 to the CC encoder 318 or the translated text 316 to the other device (e.g., subtitler or TTS device). The CC encoder 318 combines the video portion or NTSC signals 304 from the program source 300 and the translated CC data 314 from the MT computer 312. The result is a new translated NTSC signal 320 that is transmitted from the CC encoder 318 to a program destination 322.

Alternatively, or in addition, the other device 324 (e.g., subtitler or TTS device) combines the video portion or NTSC signals 304 from the program source 300 and the translated text 316 from the MT computer 312. The result is a new translated NTSC signal 326 that is transmitted from the other device 324 to a program destination 328.

Figure 4:
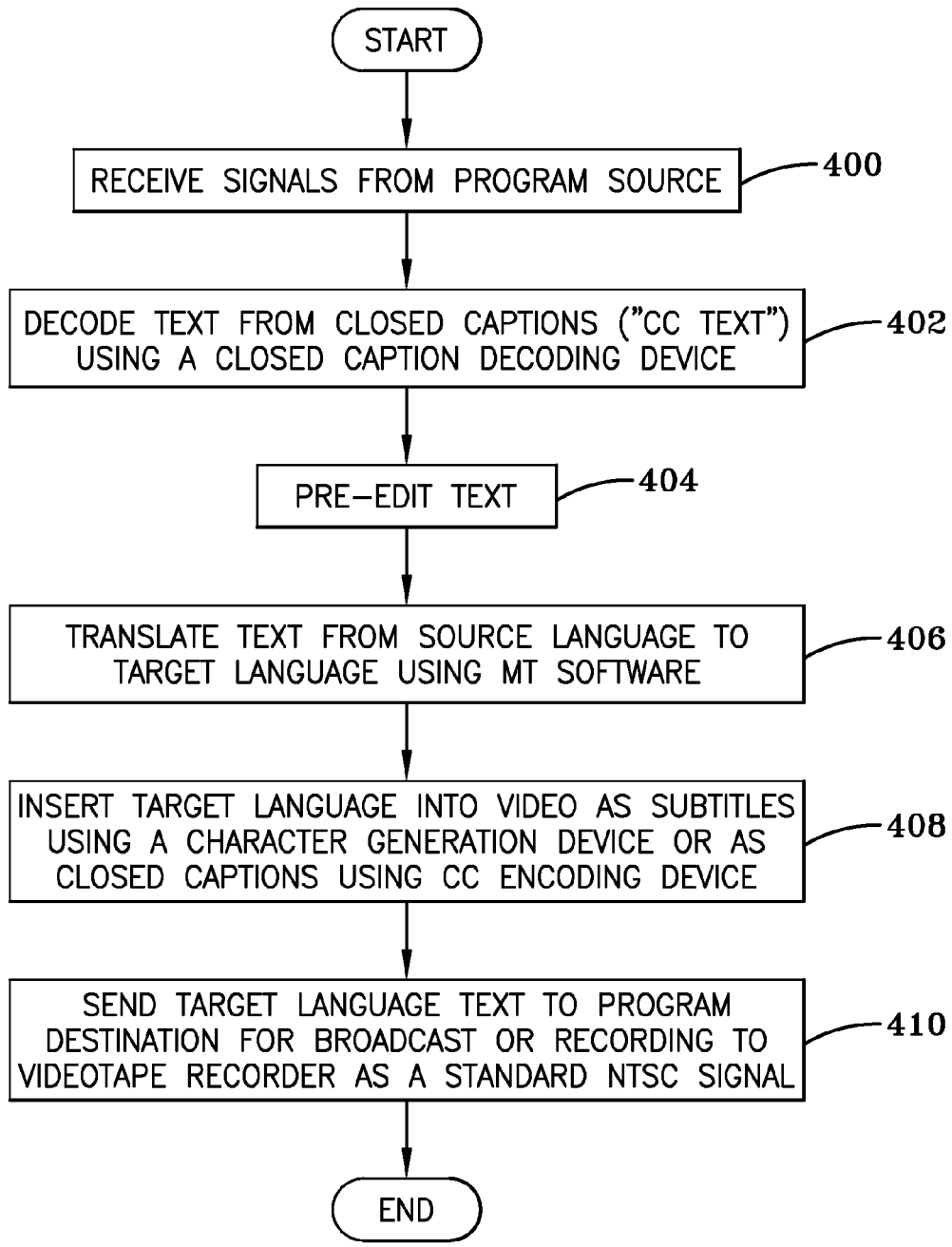
FIG. 4 is a flowchart of the primary steps for closed caption text flow management in accordance with an example embodiment of the present invention.

In accordance with the present invention, the server, shown as the MT computer in FIGS. 1, 2, and 3, in addition to MT software, may further comprise text flow management software and pre-editing software. Referring to FIG. 4, the primary steps for closed caption text flow management in accordance with an example embodiment of the present invention are shown. In an example embodiment of the present invention, the text flow management software, which is unique to the present invention, executes on a computer that also performs the machine translation. In an alternative embodiment of the present invention, the text flow management software and machine translation may execute on different computers that are connected or on a network. In the first step 400, the text flow management software receives signals from a program source such as a television broadcast or videotape recorder. In the next step 402, an incoming stream of plain text that is present in the program source as text occurring in fields CC1, CC2, CC3, or CC4 in line 21 of the VBI is decoded or extracted using a closed caption (CC) decoder that passes the CC text to the text flow management software. An example device is the Ultech SG401 that operates as a closed caption decoder or subtitle character generator.

In the next step 404, the CC text is pre-edited to correct errors in closed captions, recognize relevant text breaks, and enhance input quality. The pre-edited text is translated from a source language to a target language using machine translation software in step 406. An example of machine translation software that may be used with the present invention is Transparent Language's Transcend SDK MT program.

In step 408, the target language text produced by the MT software is inserted into the video signal. It may be inserted as subtitles using the Ultech SG401 character generator or as closed captions replacing the original CC field or any of the fields CC1, CC2, CC3, or CC4 using CC encoder equipment from many suppliers. Finally, in step 410, the target language text is sent as a standard NTSC signal to a program destination for broadcast or recording to videotape recorder. The output of the text flow management process is a television program with translated closed captions or subtitles, depending on user preference. The closed captions or subtitles are properly synchronized with the program, either through producing the translations in real-time, or in some cases, through buffering the audio and video during the translation process, and reuniting audio, video, and text once the translations are complete.

Figure 5:
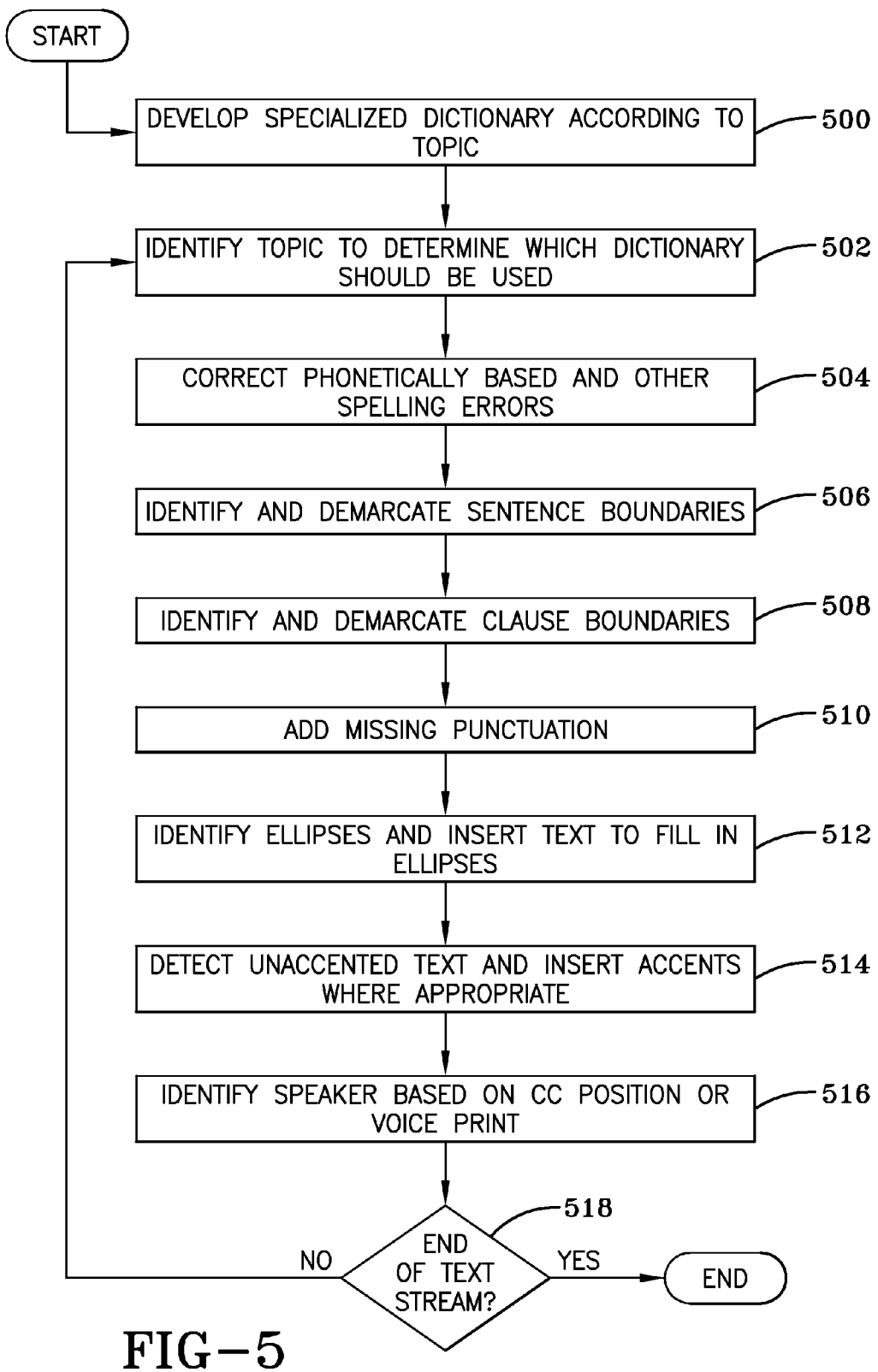
FIG. 5 is a flowchart of the primary steps for pre-editing of closed caption data in accordance with an example embodiment of the present invention.

Referring to FIG. 5, the primary steps for pre-editing of closed caption data in accordance with an example embodiment of the present invention are shown. The pre-edit software, which is unique to the present invention, solves several problems associated with real-time closed caption translation.

One problem with real-time closed caption translation is producing adequate quality translations, and doing so quickly enough so that the captions or subtitles keep pace with the live running video. Producing high quality translation of this unique text type involves several related problems. Captions that are produced on the fly for live programming such as news tend to have numerous misspellings and phonetic renderings of correct spellings. The misspellings result from the on-the-spot nature of the captioning task. Captioners who create the source language closed caption data must keep up with the real-time flow of speech. They are trained to use techniques such as phonetic spelling to quickly render proper names and other terms whose spelling cannot be determined instantly. The phonetic spellings often differ from common misspellings that occur when words are typed. Commercially available spell checking programs are not adequate for correcting these types of spellings. Because translation technology fails to recognize misspelled terms, the quality of the resulting translation is reduced. The present invention enhances the quality of the end result by pre-editing the closed caption data to recognize and correct this class of errors.

Another linguistic problem with real-time closed caption data is that a varying percentage of the text stream is complete sentences. This percentage often ranges from more than 85% in pre-written news broadcasts to as little as 20% in the unrehearsed speech of some speakers. The pre-editing techniques of the present invention identify incomplete sentences before they are passed to the translation software. In some cases, incomplete sentences are expanded to structures that are easier for the translation software to handle. In other cases, they may simply be flagged so that they are not treated as full sentences by the translation software. In either case, the result is a more accurate translation of the closed caption data.

The vocabulary set for real-time broadcasts such as news presents yet another problem. In general, the vocabulary is broad and varied and therefore, requires ongoing additions to the machine translation software's dictionaries. The present invention addresses this problem by building specialized dictionaries according to topics. These specialized dictionaries are used in the translation process to produce higher quality translations. In addition to building dictionaries, topic changes are automatically identified during a program to determine which dictionary is appropriate for the context of the program. The building and automatic selecting of specialized dictionaries results in higher quality translations of closed caption data.

Referring to FIG. 5, the automated pre-editing process of the present invention comprises the following steps. First, in step 500, specialized dictionaries are developed according to topic. The context of a particular program may be very important in developing correct translations. The use of topic-based dictionaries for use by the machine translation software allows for more accurate translations. In the next step 502, the current program topic is identified to determine which dictionary should be used by the machine translation software. The topic may be identified by examining the frequency of the occurrence of certain key words or phrases. Other techniques may be used to identify the appropriate topic. Once a dictionary is selected for the machine translation software, the process of translating incoming CC data may begin.

In step 504, phonetically based and other spelling errors occurring in the incoming text stream are corrected. Dictionaries that comprise phonetic spellings and associated correct spellings may be used to complete the correction of spelling errors. In the next step 506, sentence boundaries are identified and demarcated. In step 508, clause boundaries are identified and demarcated. Personal, business, and place names also may be identified and demarcated. After the sentence and clause boundaries are identified and demarcated, punctuation is added to the sentences and clauses, as appropriate in step 510. In step 512, ellipses appearing in the text stream are identified and text is inserted to complete the sentence. For unaccented text, accents are inserted where appropriate in step 514. In step 516, the speaker is identified based on CC position or voice print so the proper identifying information may be added to the output. Finally, in step 518, the pre-editing process checks for the end of the text stream to determine whether there is additional CC text to translate. If there is additional CC text to translate, the pre-editing process continues. Steps 502 to 516 are repeated for the incoming CC text.

The present invention translates closed caption data received from a live or taped television broadcast virtually in real-time so that a viewer can read the closed caption data in his or her preferred language during the broadcast. The present invention instantly localizes television program content by translating the closed caption data from a source language to a target language. The process of the present invention is fully automated, and includes a text flow management process and a pre-editing process that may be used in conjunction with any machine translation system. Various modifications and combinations can be made to the disclosed embodiments without departing from the spirit and scope of the invention. All such modifications, combinations, and equivalents are intended to be covered and claimed.

What is claimed is:

1. A system for translating closed caption data in a program signal during broadcast of said program signal, said program signal comprising closed caption codes and closed caption text in a source language, comprising:
   a closed caption decoder for receiving said program signal and preprocessing said program signal for translation by extracting from said program signal said closed caption codes and closed caption text in said source language;
   a server for
      (i) receiving said closed caption codes and said closed caption text in said source language from said closed caption decoder;
      (ii) pre-editing said closed caption text in said source language to change content in said caption text for submission to machine translation software and
      (iii) translating said pre-edited text in said source language to closed caption text in a target language using said machine translation software and said pre-edited text; and
   a device for receiving said closed caption codes and said closed caption text in said target language from said server, inserting said closed caption codes and said closed caption text in said target language in said program signal, and transmitting said program signal to a program destination for broadcast to all viewers of said program signal, wherein viewers that select a closed caption viewing option on their televisions during broadcast of said program signal may view said closed caption text in said target language.

2. The system of claim 1 wherein said device is a closed caption encoder.

3. The system of claim 1 wherein said device is a subtitler.

4. The system of claim 1 wherein said device is a text-to-speech module.

5. The system of claim 1 wherein said signal is from a television broadcast.

6. The system of claim 1 wherein said signal is from a videotape recorder.

7. The system of claim 1 wherein said server comprises text flow management software.

8. A method for translating closed caption data in program source signals during broadcast of said program source signals, said program source signals comprising closed caption codes and closed caption text in a source language, comprising the steps of:
   receiving said program source signals;
   decoding closed caption codes and closed caption text from said closed caption data in said program source signals;
   pre-editing said closed caption text in to change content in said closed caption text for submission to machine translation software;
   translating said pre-edited text in said source language to target language text using said machine translation software and said pre-edited text;
   inserting said closed caption codes and said target language text in program destination signals to produce closed caption text in said target language; and
   broadcasting said program destination signals to a program destination for broadcast to all viewers of said program destination signals, wherein viewers that select a closed caption viewing option on their receivers during broadcast of said program destination signals may view said closed caption text in said target language.

9. The method of claim 8 wherein the step of receiving said program source signals comprises the step of receiving said program source signals from a broadcast.

10. The method of claim 8 wherein the step of receiving said program source signals comprises the step of receiving said program source signals from a videotape recorder.

11. The method of claim 8 wherein the step of inserting said target language closed caption codes and said target language text in program destination signals comprises the step of inserting said target language closed caption text in program destination signals as subtitles.

12. The method of claim 8 wherein the step of inserting said target language closed caption codes and said target language text in program destination signals comprises the step of inserting said target language closed caption text in program destination signals as closed captions.

13. The method of claim 8 wherein the step of inserting said target language closed caption codes and said target language text in program destination signals comprises the step of inserting said target language closed caption text in program destination signals as a separate audio program.

14. The method of claim 8 wherein the step of pre-editing said closed caption text comprises the steps of:
   identifying a topic to select a dictionary for translation;
   correcting spelling errors;
   identifying and demarcating sentence boundaries;
   identifying and demarcating phrase boundaries;
   identifying and demarcating personal, business and place names;
   adding punctuation;
   identifying ellipses and inserting text; and
   detecting unaccented text and inserting accents.

15. The method of claim 14 further comprising the step of identifying a speaker.

16. An apparatus for translating closed caption data comprising closed caption codes and closed caption text in a source language comprising:
   a server adapted to
      (i) receive said closed caption codes and said closed caption text in said source language from a program broadcast during broadcast of said program;
      (ii) translate said closed caption text in said source language to closed caption text in a target language;
      (iii) insert said closed caption codes and said closed caption text in said target language in program destination signals;
      (iv) transmit said program destination signals with said closed caption text in said target language to a device for broadcast of said program destination signals with said closed caption text in said target language to a program destination, wherein viewers of said program destination signals that select a closed caption viewing option on their receivers during broadcast of said program destination signals may view said closed caption text in said target language;
   pre-editing software on said server for changing content of said closed caption text in said source language for submission to machine translation software; and
   machine translation software on said server for translating said pre-edited text in said source language to closed caption text in said target language.

17. The apparatus of claim 16 wherein said pre-editing software is adapted to:
   identify a topic to select a dictionary for translation;
   correct spelling errors;
   identify and demarcate sentence boundaries;

identify and demarcate phrase boundaries;
identifying and demarcating personal, business and place names;
add punctuation;
identify ellipses and inserting text to fill said ellipses; and
detect unaccented text and inserting accents.

18. The apparatus of claim 16 wherein said closed caption text in said target language comprises translated titles.

19. The apparatus of claim 16 wherein said closed caption text in said target language comprises translated audio.

* * * * *